United States Patent
Sawal et al.

(10) Patent No.: US 9,830,232 B2
(45) Date of Patent: Nov. 28, 2017

(54) SYSTEM AND METHOD FOR PERFORMING AN IN-SERVICE SOFTWARE UPGRADE IN NON-REDUNDANT SYSTEMS

(71) Applicant: DELL PRODUCTS L.P., Round Rock, TX (US)

(72) Inventors: Vinay Sawal, Fremont, CA (US); Swaminathan Sundararaman, Cupertino, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 14/572,314

(22) Filed: Dec. 16, 2014

(65) Prior Publication Data

US 2015/0106651 A1 Apr. 16, 2015

Related U.S. Application Data

(63) Continuation of application No. 13/460,436, filed on Apr. 30, 2012, now Pat. No. 8,966,467.

(51) Int. Cl.
G06F 9/44 (2006.01)
G06F 11/14 (2006.01)
(Continued)

(52) U.S. Cl.
CPC ............ G06F 11/1458 (2013.01); G06F 8/67 (2013.01); G06F 11/1451 (2013.01);
(Continued)

(58) Field of Classification Search
CPC .................. G06F 8/65; G06F 8/67; G06F 8/68
(Continued)

(56) References Cited

U.S. PATENT DOCUMENTS 7,802,245 B2 9/2010 Sonnier et al.
7,895,428 B2 2/2011 Boland et al.
(Continued)

OTHER PUBLICATIONS

Juniper Networks, Inc., "ISSU: A Planned Upgrade Tool—Software and Hardware Design and Implementation Principles", Jun. 2010, Downloaded from http://www.juniper.net/us/en/local/pdf/whitepapers/2000280-en.pdf on Mar. 9, 2012.
(Continued)

*Primary Examiner* — Li B Zhen
*Assistant Examiner* — Bradford Wheaton
(74) *Attorney, Agent, or Firm* — Haynes and Boone, LLP

(57) ABSTRACT

An information handling system is provided. The information handling system includes one or more devices coupled together to route information between the one or more devices and other devices coupled thereto based on routing information stored in the one or more devices. The one or more devices includes a routing processor, one or more line cards coupled to the routing processor, the one or more line cards receiving the routing information from the routing processor for routing data packets to a destination, and a memory coupled to the routing processor. The routing processor is configured to create an active image having a current state of the routing information and create a standby image having the current state of the routing information, wherein the standby image requests the current state of the routing information from the active image using a key that is calculated using a portion of the routing information.

17 Claims, 6 Drawing Sheets

(51) Int. Cl.
*H04Q 3/545* (2006.01)
*G06F 9/445* (2006.01)

(52) U.S. Cl.
CPC ........... *H04Q 3/54516* (2013.01); *G06F 8/65* (2013.01); *G06F 8/68* (2013.01); *G06F 2201/84* (2013.01)

(58) Field of Classification Search
USPC ........................................................ 717/168
See application file for complete search history.

(56) References Cited

U.S. PATENT DOCUMENTS

| | | | | |
|---|---|---|---|---|
| 8,086,998 | B2* | 12/2011 | Bansal | G06F 8/10 707/756 |
| 2002/0171683 | A1* | 11/2002 | Meaden | 345/794 |
| 2004/0083402 | A1* | 4/2004 | Atkinson | G06F 11/2038 714/11 |
| 2004/0153624 | A1* | 8/2004 | Zhou et al. | 712/4 |
| 2005/0132350 | A1* | 6/2005 | Markley et al. | 717/168 |
| 2007/0162565 | A1 | 7/2007 | Hanselmann | |
| 2007/0169083 | A1 | 7/2007 | Penubolu et al. | |
| 2009/0100004 | A1 | 4/2009 | Andrei et al. | |
| 2009/0199270 | A1* | 8/2009 | Ogita | H04L 9/32 726/2 |
| 2009/0279549 | A1 | 11/2009 | Ramanathan et al. | |
| 2011/0231833 | A1 | 9/2011 | Narayanan et al. | |
| 2013/0166502 | A1* | 6/2013 | Walkauskas | 707/610 |

OTHER PUBLICATIONS

Cisco Systems, Inc., "Cisco IOS Software: Guide to Performing In-Service Software Upgrades", 2006, Downloaded from http://www.cisco.com/en/US/products/ps7149/prod_white_papers_list.html on Mar. 9, 2012.

* cited by examiner

SYSTEM AND METHOD FOR PERFORMING AN IN-SERVICE SOFTWARE UPGRADE IN NON-REDUNDANT SYSTEMS

CROSS-REFERENCE TO RELATED APPLICATIONS

This application is a continuation of U.S. patent application Ser. No. 13/460,436, filed Apr. 30, 2012, which is hereby incorporated by reference in its entirety.

BACKGROUND

1. Technical Field

The present disclosure is related to systems and methods for performing in-service software upgrades. In particular, embodiments disclosed herein are related to systems and methods for performing in-service software upgrades in non-redundant systems and/or in information handling systems.

2. Discussion of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

However, certain information handling systems, include devices that do not have redundant hardware for preventing traffic loss in case of a device failure or for when the device goes offline to receive a software upgrade. Such systems are unable to achieve a stateful switchover and the result is significant traffic loss while the device is offline or receiving a software upgrade. What is needed is a system and method for performing in-service software upgrades in a non-redundant system that achieves a stateful switch over and minimizes traffic loss.

SUMMARY

Consistent with some embodiments, there is provided an information handling system. The information handling system includes one or more devices coupled together to route information between the one or more devices and other devices coupled thereto based on routing information stored in the one or more devices. At least one of the one or more devices includes a routing processor, one or more line cards coupled to the routing processor, the one or more line cards receiving the routing information from the routing processor for routing data packets to a destination, and a memory coupled to the routing processor. The routing processor is configured to create an active image having a current state of the routing information and create a standby image having the current state of the routing information, wherein the standby image requests the current state of the routing information from the active image using a key that is calculated using a portion of the routing information.

Consistent with some embodiments, there is also provided a method of performing an in-service software upgrade in a non-redundant system having a processor and a memory. The method includes creating an active image and a standby image, the active image and the standby image each including a table stored in the memory, generating, an index for data received by the active image, and transmitting the received data to the standby image. The method also includes calculating a key based on the data, saving, by the active image, a first tuple including the data, the index, and the key in the active image table, transmitting, by the active image, the index and data corresponding to a key received from the standby image, and saving, by the standby image, a second tuple including the index and the data received from the active image, and the key sent to the active image, in the standby active image table. The method further includes switching control from the active image and the standby image when the active image receives a software upgrade.

Consistent with some embodiments, there is further provided a device having a processor and a memory, the memory including instructions that when executed by the processor cause the processor to perform a method. The method includes creating an active image and a standby image, the active image having control of the device, creating an active image table and a standby image table, the active image table and the standby image table storing information related to the operation of device, and transmitting a data value received by the active image to the standby image. The method also includes generating, by the active image, an index for the received data value, calculating, by the active image and the standby image, a key based on the received data value, storing, by the active image, the received data value, the generated index, and the calculated key in the standby image table, transmitting, by the active image, the received data value and the generated index to the standby image in response to a request received from the standby image including the calculated key, and storing, by the standby image, the received data value, the generated index, and the calculated key in the standby image table. The method further includes switching control of the device from the active image to the standby image when the active image becomes inactive.

These and other embodiments will be described in further detail below with respect to the following figures.

Figure 1:
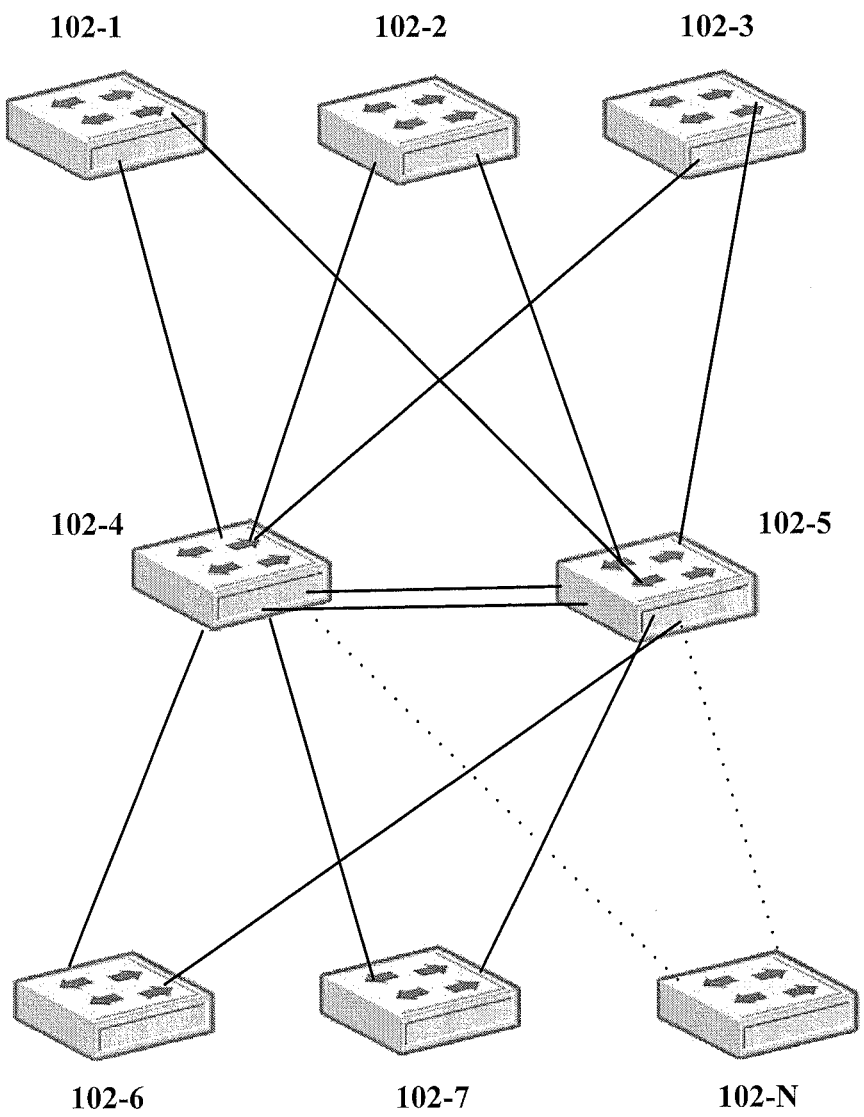
FIG. 1 shows an information handling system consistent with some embodiments.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 shows an information handling system consistent with some embodiments. As shown in FIG. 1, information handling system 100 includes a plurality of devices 102-1-102-N coupled to each other in a linked or aggregated arrangement. Consistent with some embodiments, devices 102-1-102-N may include any appropriate combination of hardware and/or software having a processor and capable of reading instructions stored on a non-transitory machine-readable medium for execution by the processor. Consistent with some embodiments devices 102-1-102-N include a machine-readable medium, such as a memory (not shown) that includes instructions for execution by a processor (not shown) for causing devices 102-1-102-N to perform specific tasks. For example, such instructions may include handling and routing information. In particular, devices 102-1-102-N may be configured to route and forward data packets based on [index, value] tuples describing a destination of the data packets. Some common forms of machine-readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 2:
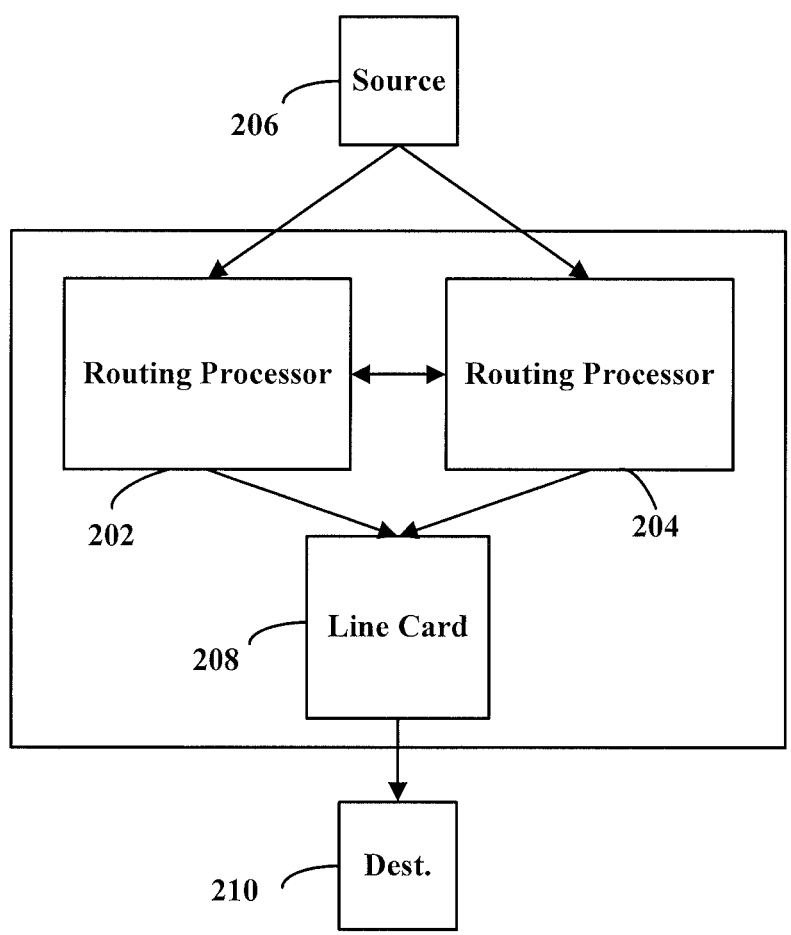
FIG. 2, is a diagram illustrating a device having redundant routing processors for providing minimal packet loss during an in-service software upgrade, consistent with some embodiments

Consistent with some embodiments, devices 102-1 to 102-N are coupled together to transmit information between each other and to other devices coupled to devices 102-1-102-N. System 100 may represent a local area network, a wide area network, or a link aggregation group. When any of device 102-1-102-N require a software upgrade, it is desirable to minimize or eliminate any downtime on the routing device in order to prevent the loss of any data. In particular, the goal of an In-Service Software Upgrade (ISSU) is to enable upgrading or downgrading the running software image on a platform configured with redundant supervisors providing minimal packet loss. In some network systems, ISSU may be achieved by incorporating redundant switching/routing engines or routing processors (RPs) in the system. FIG. 2, is a diagram illustrating device 102-N having redundant routing processors for providing minimal packet loss during an ISSU, consistent with some embodiments.

As shown in FIG. 2, device 102-N includes a first routing processor 202 and a second routing processor 204 both coupled to a source 206 and a line card 208. Line card 208 may represent one or more line cards. Routing processors 202 and 204 may also be coupled to each other, and may be configured to provide routing information for line card 208 to direct packets received from a source 206 to a destination 210. In particular, routing processors 202 and 204 may be configured to calculate hardware and software tables that reflect states in the forwarding/routing tables as an (index, value) tuple.

Figure 3:
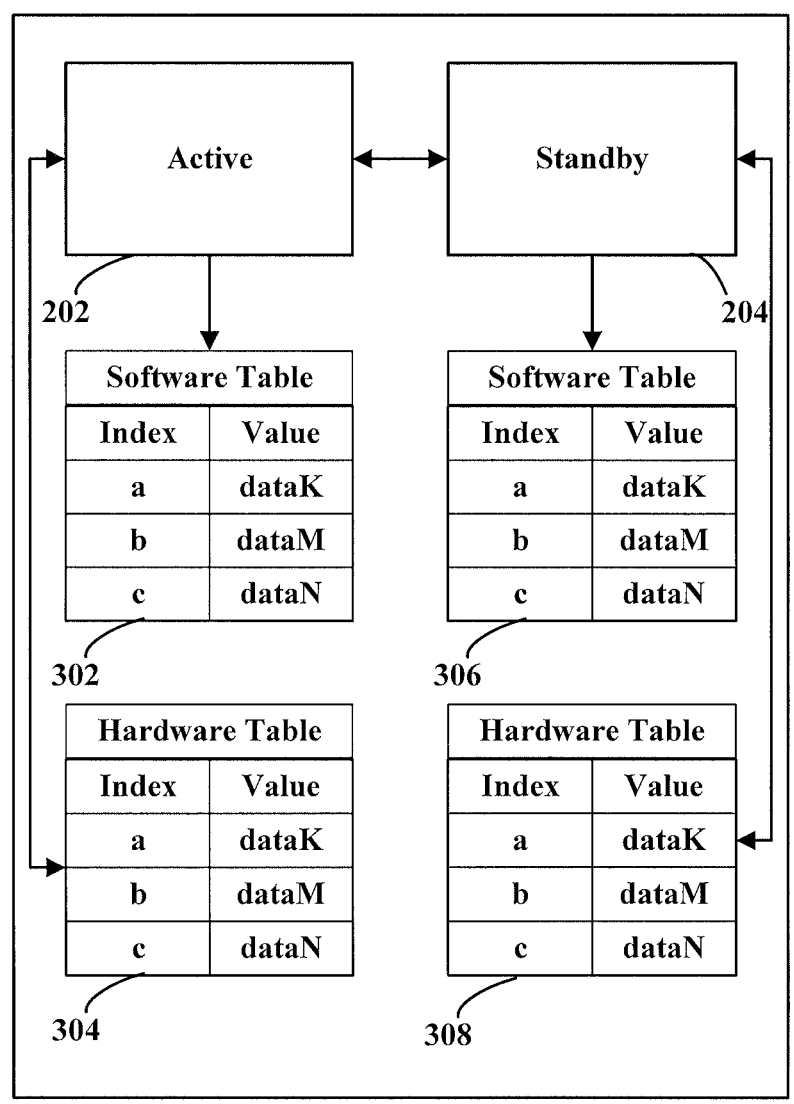
FIG. 3 is a diagram illustrating an in-service software upgrade performed on a device, consistent with some embodiments.

FIG. 3 is a diagram illustrating an in-service software upgrade performed on device 102-N, consistent with some embodiments. As shown in FIG. 3, routing processor 202 may be configured to be an "active" processor, while routing processor 204 may be configured to be a "standby" processor. Active routing processor 202 maintains a software table 302 and a hardware table 304 representing, for example, the current state of the hardware of device 102-N (e.g., TCAM or other memories) required for a software upgrade modeled most simply as a series of (index, value) tuples that are stored in software table 302 and hardware table 304 and represent addresses for forwarding and routing packets. Each time the state of the hardware changes, active routing processor 202 accepts a request for a new value, and calculates an index for the new value. This new index and value tuple is synchronized with standby routing processor 204 and stored in software table 306 and hardware table 308 of standby routing processor 204. This synchronization ensures that standby routing processor 204 always has stored the latest view of the state of the hardware. Accordingly, when routing device 102-N receives a software upgrade or otherwise fails or is taken offline, standby routing processor 204 becomes the active processor while active routing processor 204 goes offline and undergoes the upgrade. Because standby routing processor 204 was being synchronized with active routing processor 202 and had stored the latest view of the state of the hardware, standby routing processor 204 can seamlessly take over the functions of active routing processor 202 without the loss of data. Consequently, standby routing processor 204 is considered to be "standby hot" and device 102-N is capable of stateful switchover (SSO). Once the software upgrade of active routing processor 202 is completed, it will become the standby processor that is synchronized with processor 204. Once the synchronization is complete, processor 202 can return to being the active routing processor while processor 204 receives the software upgrade.

The system shown in FIG. 3 utilizes two separate processors, active processor 202 and standby processor 204, each having related memory for storing software tables 302 and 306 and hardware tables 304 and 308. However, using two separate processors as a redundancy increases the costs associated with routing devices 102-N and system 100. In-service software upgrades may be achieved by using Virtual Machines (VMs) for the active processor and standby processor 204. However, VMs are not supported on all processor architectures and may require additional memory or a faster CPU.

Figure 4:
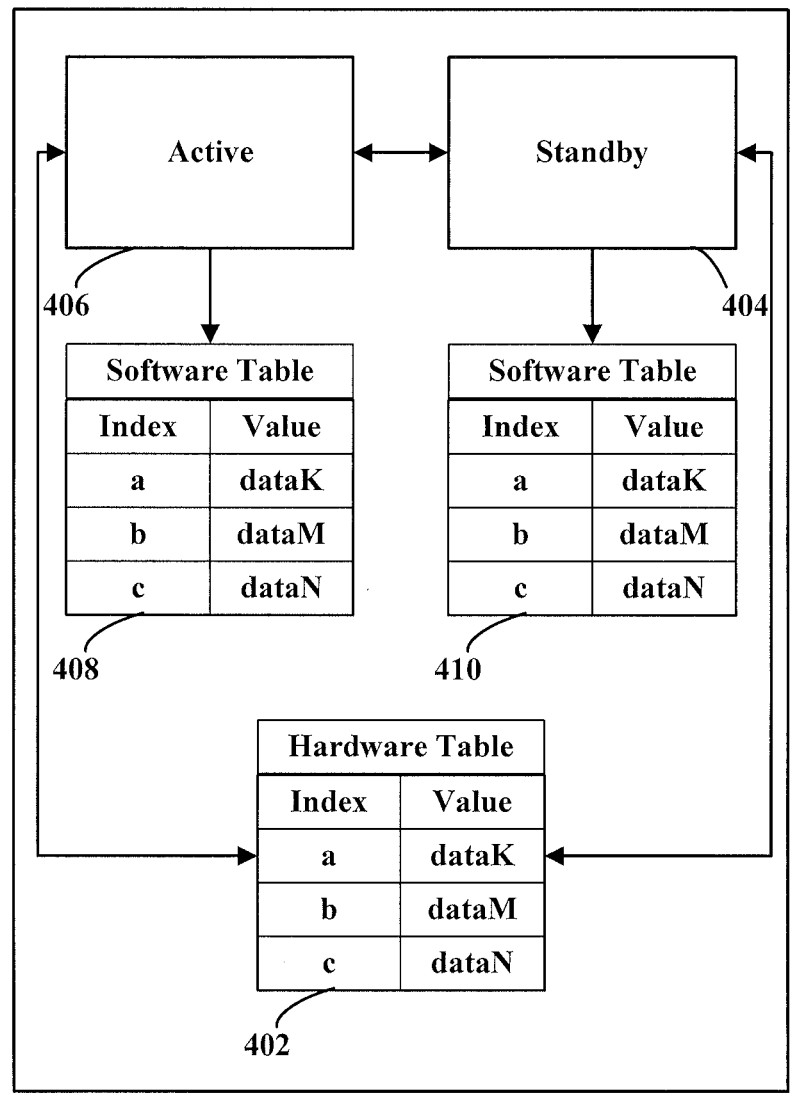
FIG. 4 is a diagram illustrating performing an in-service software upgrade on a non-redundant system, consistent with some embodiments.

FIG. 4 is a diagram illustrating performing an in-service software upgrade on a non-redundant system, consistent with some embodiments. In-service software upgrades for non-redundant systems poses interesting challenges since there is only one set of hardware resources. That is, there is typically only a single processor and memory in a device 400 undergoing a software upgrade. In order to perform an in-service software upgrade, conventional non-redundant systems may create a copy of the hardware tables 402 just before the upgrade, undergo the upgrade, and then rewrite the copied hardware tables 402. In particular, conventional systems may create a "standby" image 404 that learns the state of the hardware from the existing image, which is referred to as the "active" image 406. After standby image 404 has learned the state of the hardware, active image 406 exits and standby image 404 assumes control of the hardware, essentially becoming the new active image. For the purposes of an in-service upgrade, the hardware, typically ternary content addressable memory (TCAM) or other memories, required for the upgrade process can be viewed as hardware table 404, and is modeled most simply as a series of (index, value) tuples. When a request is made for a new value in the hardware, an index is computed for that value, and the (index, value) tuple is stored in software table 408 of active image 406. Bringing standby image 404 into coherence with active image 406 typically involves making one request for each value currently stored in hardware table 402 and in software table 408, and then saving the requested (index, value) tuple in software table 410. Once all requests have been issued, standby image 404 will have a model of hardware table 402 in software table 410 that performs the same function as the currently programmed hardware in hardware table 402. Then, when active image 406 receives an upgrade, control may pass to standby image 404, which is now the active image that has a model of hardware table 402 stored in software table 410, while the active image 406 receives the upgrade.

However, the computation of the index depends on the value being stored, other values that have been stored, and values that have been stored but which have been deleted. In other words, the index of a value does not depend solely on the values being programmed into hardware table 402, but on the historical values that were once programmed. This means that standby image 404 may not have an entirely accurate view of the physical programming of the hardware stored in software table 410, which means that standby image 404 cannot assume control of the hardware under these circumstances. In particular, a problem is how to supply a software framework that allows standby image 404 to acquire an accurate view of the hardware without re-writing hardware tables 402 from scratch using software table 410. Moreover, since standby image 404 does not have direct access to and cannot control hardware table 402, a predetermined amount of memory equal to the size of hardware table is set aside for software table 410 and is emulated as hardware. However, in the event of a failover, all traffic is halted, all of the values in hardware table 402 are re-written with the values stored in software table 410 so that software table 410 and hardware table 402 are consistent, and traffic can be restarted. The problem with this approach is that it takes additional memory resources and it may take several seconds to re-write all the hardware tables resulting in a tangible traffic loss. As a result standby image 402 is not considered to be "standby hot" and device 400 cannot achieve a stateful switchover (SSO) from active image 402 to standby image 404.

Figure 5:
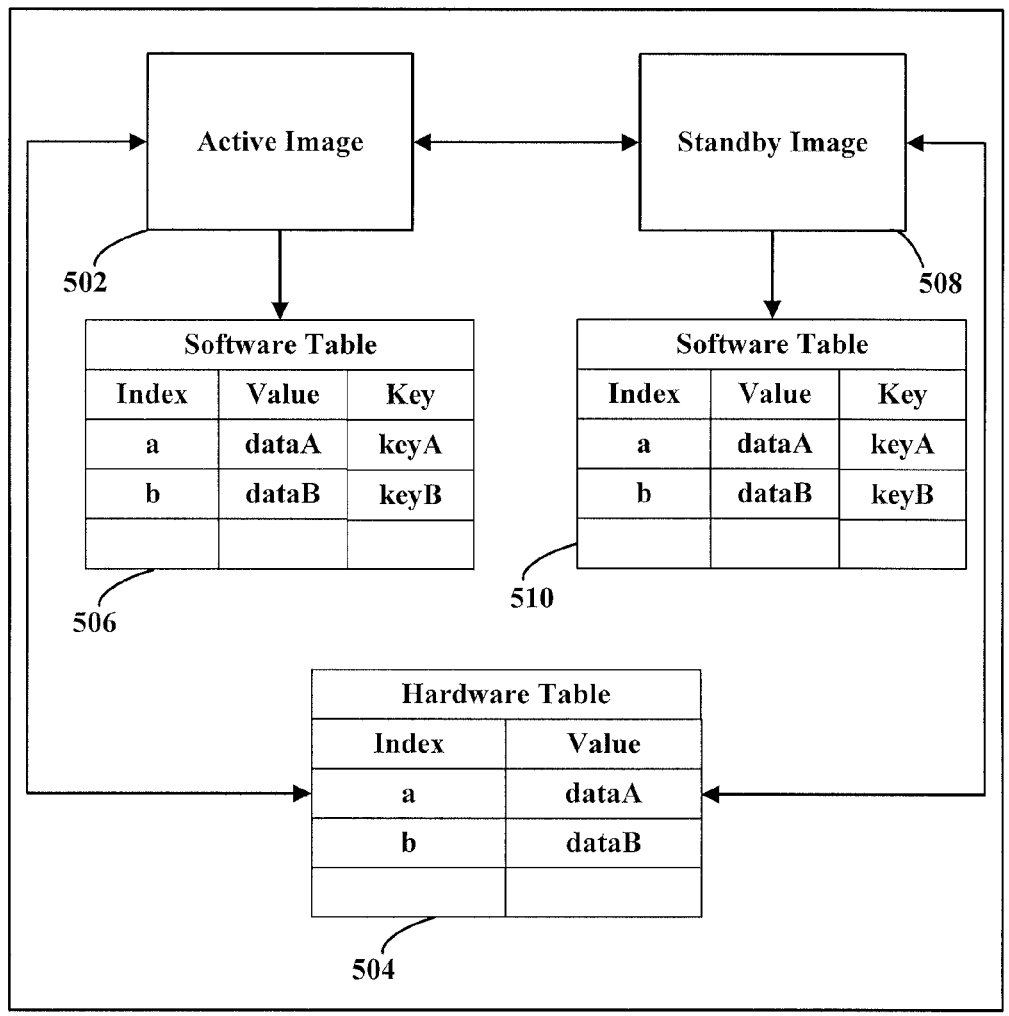
FIG. 5 is a diagram illustrating performing an in-service software upgrade on a non-redundant system, consistent with some embodiments.

FIG. 5 is a diagram illustrating performing an in-service software upgrade on a non-redundant system using (index, value, key) tuples, consistent with some embodiments. As shown in FIG. 5, a device 500 undergoing an in-service software upgrade models the existing hardware of device 500 as an (index, value, key) tuple, where the index and value are the same as in FIGS. 3 and 4, and the key is an object that is derived from the request and which uniquely identifies the tuple. Consistent with some embodiments, active image 502 creates a tuple every time it programs a new entry into the hardware table 504, and saves a copy of the created tuple in software table 506 along with a calculated key. Moreover, active image 502 may be configured to retrieve a tuple saved in software table 506 based on its key.

As shown in FIG. 5, a standby image 508 having a software table 510 is also created, similar to FIG. 4. Consistent with some embodiments, active image 502 may be configured to transmit a copy of the entry programmed into hardware table 504 to standby image 508. When standby image 508 receives this entry, standby image 508 may be configured to compute the key associated with that entry, and requests the corresponding tuple stored in software table 506 from active image 506. As a result, software table 510 of standby image 508 will always be the same as software table 506 of active image, and both will always be the same as hardware table 504, ensuring that both standby image 508 and active image 502 always have the same view of the hardware of device 500. Then, when active image 502 receives an upgrade, control may pass to standby image 508, which is now an active image that has a correct and up to date model of hardware table 504 stored in software table 510, while active image 502 receives the upgrade. Consequently, when an in-service software upgrade is performed on active image 502, standby image 504 has a correct view of the hardware, and there will be no interruption of the hardware behavior resulting in a "near hitless" takeover of the hardware and a stateful switchover (SSO).

Figure 6:
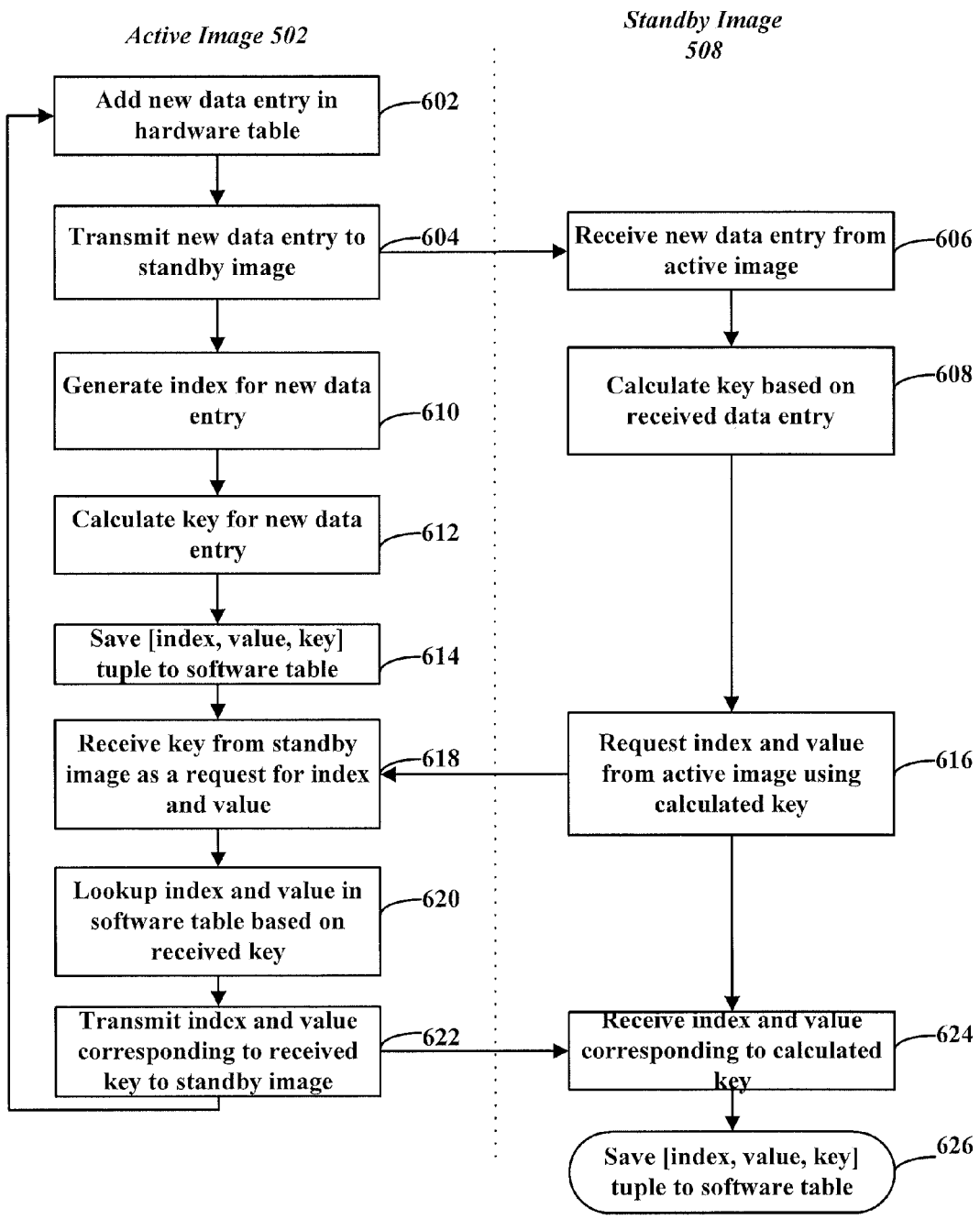
FIG. 6 is a flowchart illustrating a method for performing an in-service software upgrade, consistent with some embodiments.

FIG. 6 is a flowchart illustrating a method for performing an in-service software upgrade, consistent with some embodiments. For the purpose of illustration, FIG. 6 will be discussed in conjunction with FIG. 5. As shown in FIG. 6, the method for performing an in-service software upgrade includes steps that are performed by active image 502 and by standby image 508. Moreover, consistent with some embodiments, the roles of "active" image and "standby" image may switch between what is currently referred to as active image 502 and standby image 508 when active image 502 exits and undergoes an upgrade and standby image 508 assumes control and becomes the new "active" image. As shown in FIG. 6, the method begins when active image 502 adds a new data entry into hardware table 504 (602). Consistent with some embodiments, the new data entry may represent a new state of the hardware of device 500. The new data entry is then transmitted to standby image 508 in order to synchronize standby image 508 with active image 502

(604). Standby image 508 receives the new data entry from active image 502 (606) and calculates a key based on the received data entry (608). Consistent with some embodiments, the key may be calculated by using a predetermined function of the received data entry.

Meanwhile, active image 502 generates an index for the new data entry (610). Consistent with some embodiments, the generated index is generated as an opaque data type. An opaque data type is a data type that is incompletely defined in an interface, so that its values can only be manipulated by calling subroutines that have access to the missing information. In other words, an opaque data type does not have a data type associated with it such that it appears as basically a typeless data object. By generating the index as an opaque data type, existing and future systems can be changed to operate similar to the system shown in FIG. 5 and the method described in FIG. 6 such that existing software codes, designed without the requirement for in-service upgrades, can be easily transformed to support near hitless in-service upgrades. In particular, methods that handle an index (such as shown in FIGS. 3 and 4) can be changed at the hardware programming interface to handle an opaque index instead of the index. Moreover, a compiler may identify all instances of an index to be changed such that instead of handling an index and computing an address, an opaque type index is returned instead. Consistent with some embodiments, the key may be required to generate the index. As a side-effect of generating the index using the key, the key may be verified as unique and the (index, key) tuple may be stored for later retrieval.

Returning to FIG. 6, active image 502 then calculates a key based on the new data entry (612). Consistent with some embodiments, the key may be calculated by using a predetermined function of the new data entry. According to some embodiments, the predetermined function may be the same function that is used by standby image 508 to calculate a key in step 608. After calculating the key and generating the index for the new data entry, active image now has a complete (index, value, key) tuple, and saves this tuple to software table 506 (614). In order to maintain an up to date and active view of hardware table 504, standby image 508 requests the generated index and data entry value from active image 502 using the calculated key (616). Active image 502 receives the key from standby image 508 as a request for the generated index and data entry value (618). Using the key received from standby image 508, active image 502 performs a lookup operation in software table 506 for the corresponding index and value to the key received from standby image 508 (620). The index and value corresponding to the received key is then transmitted to standby image 508 (622). Standby image receives the index and value corresponding to the calculated key (624) and, now having a complete (index, value, key) tuple, saves the tuple to software table 510 (626). The steps will repeat each time a new data entry is added in hardware table 504 so that software table 510 of standby image 508 will always have an exact copy of software table 506 of active image 502 and, thus an up to date and accurate view of the current state of the hardware. Since standby image 508 always has an exact copy of software table 506 of active image 502, when active image 502 receives an upgrade, control can seamlessly switch over to standby image such that the transition is near hitless. Consistent with some embodiments, an in-service software upgrade may be performed during a maintenance window and may take between 5 through 30 minutes to complete, as long as the traffic disruption is minimal.

The system shown in FIG. 5 and the method described in FIG. 6 may allow a system to perform a near hit-less software upgrade. Further, since standby image 508 always know the states of the hardware, standby image is considered to be "standby hot" such that standby image 508 can take over for active image 502 if active image 502 goes down. As a result the system shown in FIG. 5 using the method described in FIG. 6 may be used to achieve stateful switchover (SSO) process level redundancy.

Unlike the system shown in FIG. 4, the system shown in FIG. 5 implementing the method shown in FIG. 6 does not require any additional system resources and, since software table 510 is always synchronized with hardware table 504, there is no need to re-write the values in hardware table 504 when a failover occurs, resulting in minimal traffic loss. Further, the system shown in FIG. 5 implementing the method shown in FIG. 6 does not require or utilize virtual machines and, thus, can be made processor architecture independent. Indeed, the system shown in FIG. 5 and the method shown in FIG. 6 may be used in any device having hardware and software capable of executing the steps shown in FIG. 6 and that would benefit from such a method when performing an in-service software upgrade. For example, in symmetric multiprocessor (SMP) systems with multicore CPUs where the system is configured for process affinity such that an active process is running on one core and a standby process is running on another core, the method shown in FIG. 6 may be utilized such that the active core and the standby core correspond to active image 502 and standby image 508.

One particular application in which the system of FIG. 5 and method described in FIG. 6 may be used is as an on-going redundancy mechanism in a distributed forwarding switching system where packets are forwarded based on an index and value, such as system 100 shown in FIG. 1. In particular, the system of FIG. 5 and method described in FIG. 6 may be used in a device 102-N such that active image 502 and standby image 508 replace the need for two routing processors 202 and 204 shown in FIG. 2. Instead, a single routing processor may be used to create both active image 502 and standby image 508, providing significant savings in the costs, size, and power consumption of a device such as device 102-N.

Consistent with embodiments described herein, there is provided systems and methods that perform an in-service software upgrade on non-redundant systems such that the upgrade is near hitless and stateful switchover may be achieved. The systems and methods described herein may be implemented on existing and future systems using opaque data types and may provide a system that achieves stateful switchover without using additional hardware or hardware resources. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A network device having a processor and a memory, the memory including instructions that when executed by the processor cause the processor to perform a method comprising:

maintaining an active image and a standby image, the active image having control of the device;

receiving, by the active image, a data value representing an entry in a routing or forwarding table, the entry comprising an address used for routing and forwarding data packets:

providing, by the active image, the data value to the standby image;

determining, by the active image, an index for the data value, the index being based on a position of the data value within a first routing or forwarding table maintained by the active image;

calculating, by the active image, a first key as a function of only the data value;

storing, by the active image, the data value, the index, and the first key in the first routing or forwarding table;

calculating, by the standby image, a second key as a function of only the data value;

receiving, by the active image, a request for the index and the data value from the standby image, the request including the second key;

providing, by the active image in response to receiving the request from the standby image, the data value and the index to the standby image when the first key matches the second key;

storing, by the standby image, the data value, the index, and the second key in the second routing or forwarding table; and switching control of the device from the active image to the standby image when the active image becomes inactive.

2. The device of claim 1, wherein the active image becomes inactive based on one or more selected from a croup consisting of a failure of the active image and when a software upgrade is received.

3. The device of claim 1, wherein the index for the data value comprises an opaque data type index.

4. The device of claim 1, wherein switching control of the device from the active image to the standby image is near hitless and stateful.

5. The device of claim 1. wherein the index is generated using the first key.

6. The device of claim 1, wherein the data value, the index, and the first key are stored as a tuple.

7. A method of performing an in-service software upgrade in a network device having a processor and a memory, comprising:

maintaining, by the processor, an active image and a standby image, the active image having control of the network device;

receiving, by the active image, a data value representing an entry in a routing or forwarding table, the entry comprising an address used for routing and forwarding data packets: providing, by the active image, the data value to the standby image; determining, by the active image, an index for the data value, the index being based on a position of the data value within a first routing or forwarding table maintained by the active image;

calculating, by the active image, a first key as a function of only the data value;

storing, by the active image, the data value, the index, and the first key in the first routing or forwarding table;

calculating, by the standby image, a second key as a function of only the data value;

receiving, by the active image, a request for the index and the data value from the standby image, the request including the second key;

providing, by the active image in response to receiving the request from the standby image, the data value and the index to the standby image when the first key matches the second key;

storing, by the standby image, the data value, the index, and the second key in the second routing or forwarding table; and switching control of the network device from the active image to the standby image when the active image becomes inactive.

8. The method of claim 7, wherein the active image becomes inactive based on one or more selected from a group consisting of a failure of the active image and when a software upgrade is received.

9. The method of claim 7, wherein determining the index for the data value comprises generating an opaque data type index.

10. The method of claim 7, wherein switching control of the network device from the active image to the standby image is near hitless and stateful.

11. The method of claim 7, wherein the index is generated using the first key.

12. The method of claim 7, wherein storing the data value, the index, and the first key by the active image comprises storing the data value, the index, and the first key as a tuple.

13. An information handling system, comprising:

one or more network devices coupled together to route information between the one or more network devices and other network devices coupled thereto based on routing information stored in the one or more network devices, wherein a first device of the one or more network devices comprises: a routing processor;

one or more line cards coupled to the routing processor, the one or more line cards receiving the routing information from the routing processor for routing data packets to a destination; and a memory coupled to the routing processor, wherein the routing processor is configured to:

maintain an active image and a standby image, the active image having control of the first device;

receive, by the active image, a data value representing an entry in a routing or forwarding table, the entry comprising an address used for routing and forwarding data packets:

provide, by the active image, the data value to the standby image;

determine, by the active image, an index for the data value, the index being based on a position of the data value within a first routing or forwarding table maintained by the active image;

calculate, by the active image, a first key as a function of only the data value;

store, by the active image, the data value, the index, and the first key in the first routing or forwarding table;

calculate, by the standby image, a second key as a function of only the data value;

receive, by the active image, a request for the index and the data value from the standby image, the request including the second key;

provide, by the active image in response to receiving the request from the standby image, the data value and the index to the standby image when the first key matches the second key;

store, by the standby image, the data value, the index, and the second key in the second routing or forwarding table; and switch control of the first device from the active image to the standby image when the active image becomes inactive.

14. The information handling system of claim 13, wherein the active image becomes inactive based on one or more selected from a group consisting of a failure of the active image and when a software upgrade is received.

15. The information handling system of claim 13, wherein the switch of control from the active image to the standby image is stateful.

16. The information handling system of claim 13, wherein the routing processor is further configured to generate the index using the first key.

17. The information handling system of claim 13, wherein the routing processor is further configured to store the data value, the index, and the first key as a tuple.

* * * * *